(12) United States Patent
Hübener et al.

(10) Patent No.: US 11,971,118 B2
(45) Date of Patent: Apr. 30, 2024

(54) VACUUM VALVE OR VACUUM DOOR

(71) Applicant: VAT Holding AG, Haag (CH)

(72) Inventors: Marc Hübener, Lindau (DE); Arthur Büchel, Ruggell (LI); Markus Poppeller, Feldkirch (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 17/767,525

(22) PCT Filed: Dec. 3, 2020

(86) PCT No.: PCT/EP2020/084511
§ 371 (c)(1),
(2) Date: Apr. 8, 2022

(87) PCT Pub. No.: WO2021/115924
PCT Pub. Date: Jun. 17, 2021

(65) Prior Publication Data
US 2024/0102581 A1 Mar. 28, 2024

(30) Foreign Application Priority Data
Dec. 9, 2019 (DE) .......................... 102019133555.8

(51) Int. Cl.
*F16K 51/02* (2006.01)
*F16K 3/02* (2006.01)
(Continued)

(52) U.S. Cl.
CPC ............ *F16K 51/02* (2013.01); *F16K 3/0227* (2013.01); *F16K 3/18* (2013.01); *F16K 27/044* (2013.01)

(58) Field of Classification Search
CPC ........ F16K 51/02; F16K 3/0227; F16K 3/188; F16K 3/18; F16K 27/044
See application file for complete search history.

(56) References Cited

U.S. PATENT DOCUMENTS 5,566,922 A * 10/1996 Tanaka .................... F16K 3/188
251/157
5,746,434 A 5/1998 Boyd et al.
(Continued)

FOREIGN PATENT DOCUMENTS

AT 509098 6/2011
DE 69014094 11/1994
(Continued)

*Primary Examiner* — David Colon-Morales
(74) *Attorney, Agent, or Firm* — Volpe Koenig

(57) ABSTRACT

A vacuum valve or door having a closure plate for closing an opening in a wall. The opening has opposing first and second longitudinal edges and shorter opposing first and second transverse edges. A sealing unit seals the closure plate against the wall in the closed position. The sealing unit includes a supporting frame having opposing first and second longitudinal legs and shorter opposing first and second transverse legs, on which supporting frame there is mounted on one side a circumferential closure plate seal and on the other side a circumferential wall seal. The supporting frame is secured to fastening points on the wall, with central portions of the first and second longitudinal legs being free with respect to the wall, or the supporting frame is secured to fastening points on the closure plate, with the central being free with respect to the closure plate.

16 Claims, 9 Drawing Sheets

(51) Int. Cl.
*F16K 3/18* (2006.01)
*F16K 27/04* (2006.01)

(56) References Cited

U.S. PATENT DOCUMENTS

| | | | | |
|---|---|---|---|---|
| 6,056,266 | A * | 5/2000 | Blecha | F16K 3/0218 |
| | | | | 251/193 |
| 6,629,682 | B2 | 10/2003 | Duelli | |
| 6,899,316 | B2 * | 5/2005 | Duelli | F16K 3/188 |
| | | | | 251/158 |
| 7,611,122 | B2 * | 11/2009 | Tichy | F16K 31/122 |
| | | | | 251/193 |
| 8,678,344 | B2 * | 3/2014 | Ehrne | F16K 3/314 |
| | | | | 251/87 |
| 8,807,527 | B2 * | 8/2014 | Kim | F16K 3/188 |
| | | | | 137/553 |
| 8,827,241 | B2 * | 9/2014 | Geiser | F16K 3/188 |
| | | | | 251/193 |
| 9,157,538 | B2 * | 10/2015 | Bachmann | F16K 51/02 |
| 9,581,262 | B2 * | 2/2017 | Duelli | F16K 3/0281 |
| 9,732,860 | B2 * | 8/2017 | Blecha | F16K 3/188 |
| 9,752,703 | B2 * | 9/2017 | Kho | F16K 3/18 |
| 9,791,052 | B2 * | 10/2017 | Blecha | F16K 3/16 |
| 9,851,012 | B2 | 12/2017 | Kienreich et al. | |
| 9,957,745 | B2 * | 5/2018 | Ehrne | E05F 5/08 |
| 9,976,655 | B2 * | 5/2018 | Ehrne | F16K 3/182 |
| 10,184,291 | B2 * | 1/2019 | Blecha | E06B 5/10 |
| 10,302,225 | B2 * | 5/2019 | Ehrne | F16K 3/188 |
| 10,364,899 | B2 * | 7/2019 | Albrecht | F16K 3/12 |
| 10,746,307 | B2 * | 8/2020 | Nagai | F16K 27/044 |
| 11,486,503 | B2 * | 11/2022 | Gachter | H01L 21/67126 |
| 2006/0028596 | A1 | 2/2006 | Leung et al. | |
| 2011/0287374 | A1 | 11/2011 | White et al. | |
| 2014/0023460 | A1 | 1/2014 | Behdjat et al. | |

FOREIGN PATENT DOCUMENTS

| | | | |
|---|---|---|---|
| DE | 102013202631 | 8/2014 | |
| EP | 436770 | 7/1991 | |
| JP | H0860374 | 3/1996 | |
| JP | 2010165920 | 7/2010 | |
| JP | 2015081633 | 4/2015 | |
| WO | 2014086458 | 6/2014 | |
| WO | WO-2014086458 A1 * | 6/2014 | F16K 27/044 |

* cited by examiner

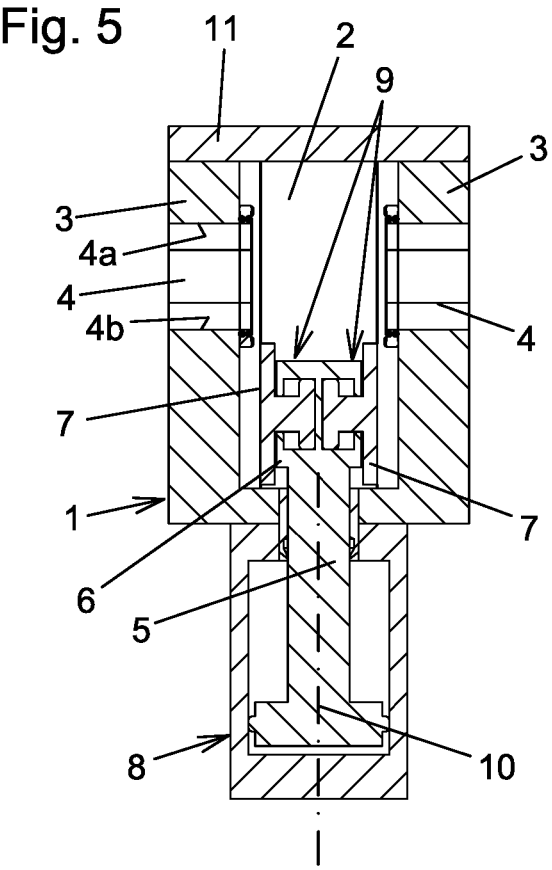
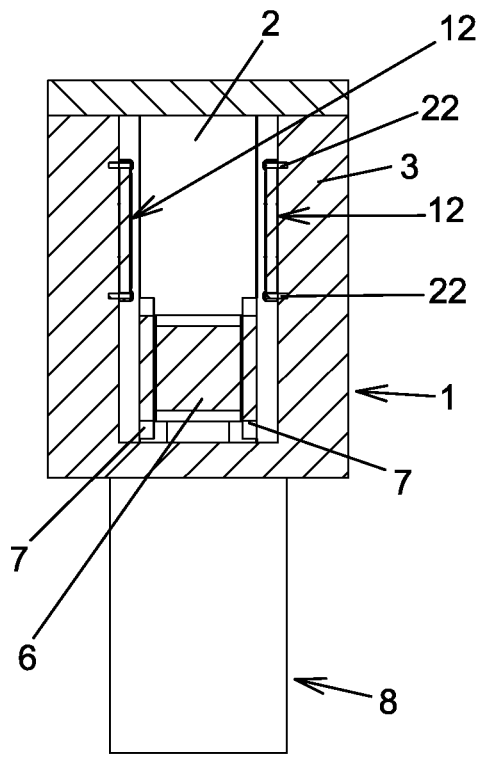
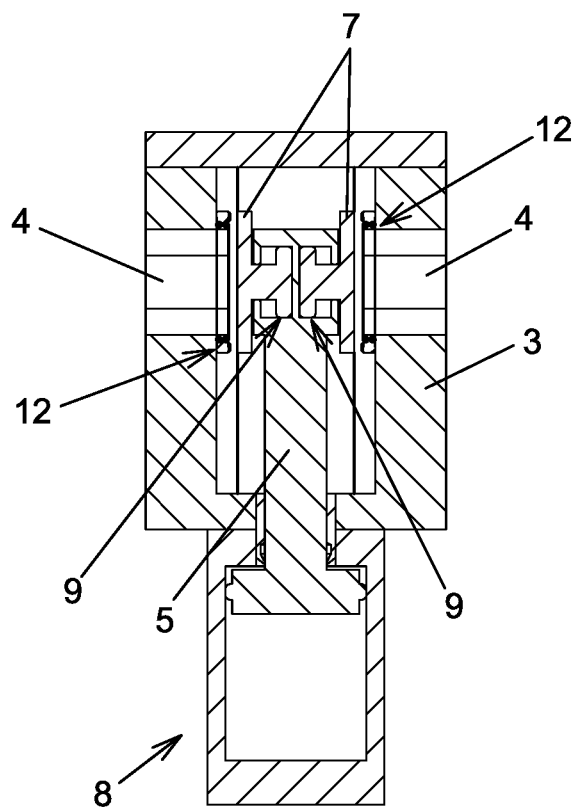

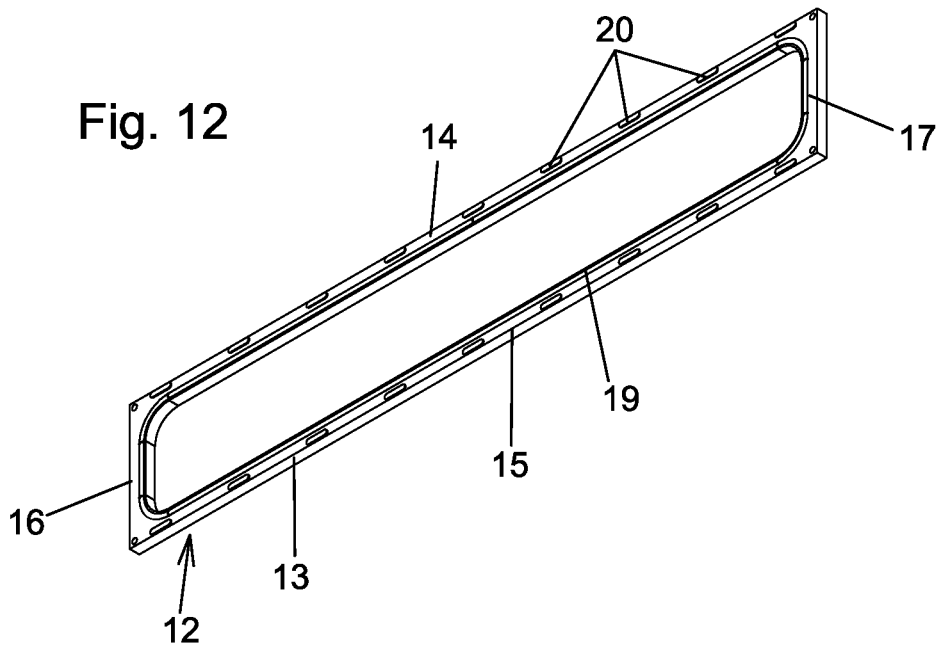
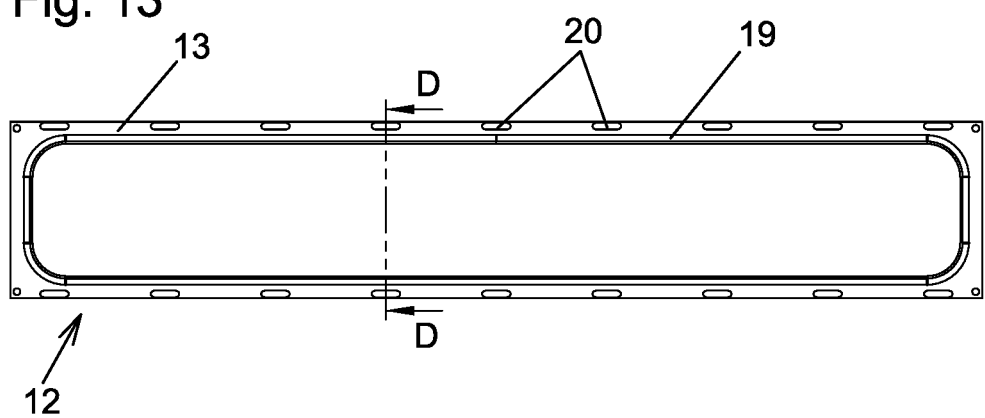
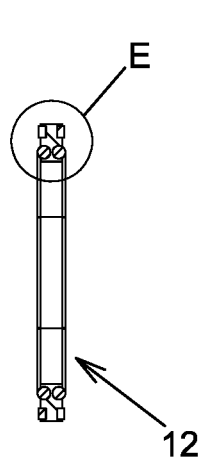
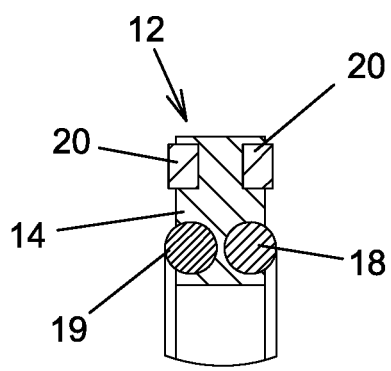

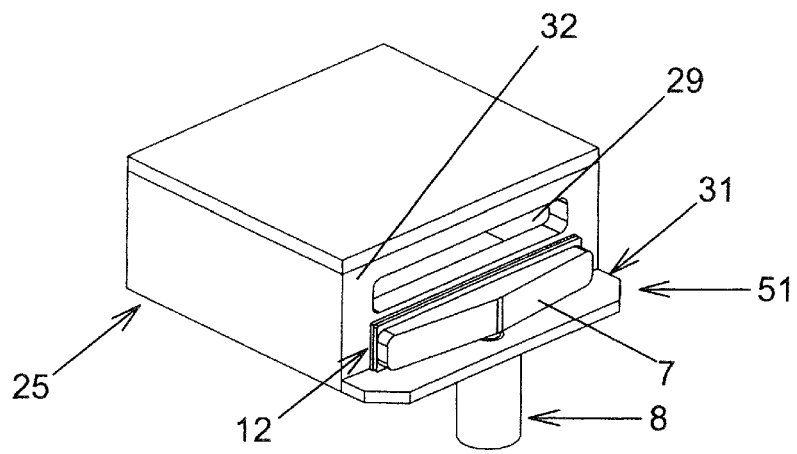
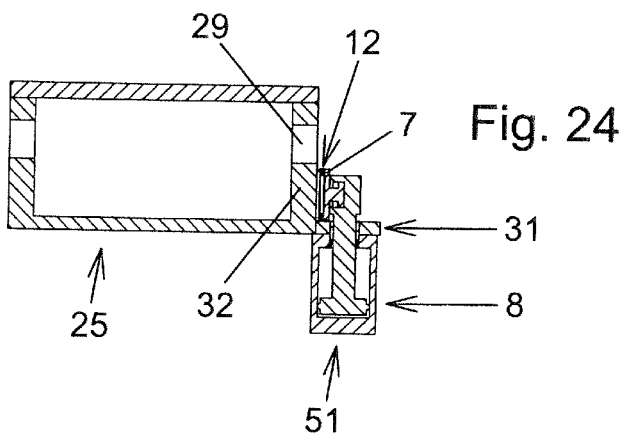
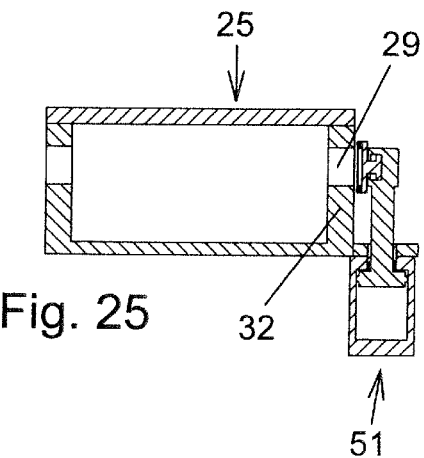
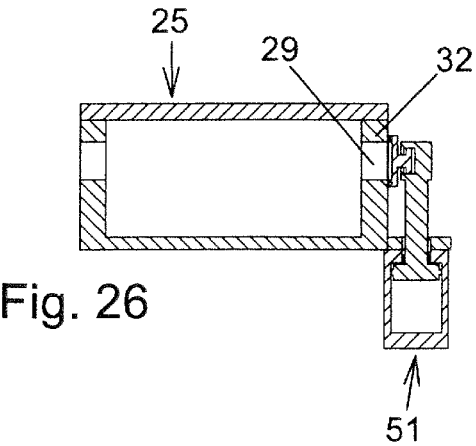
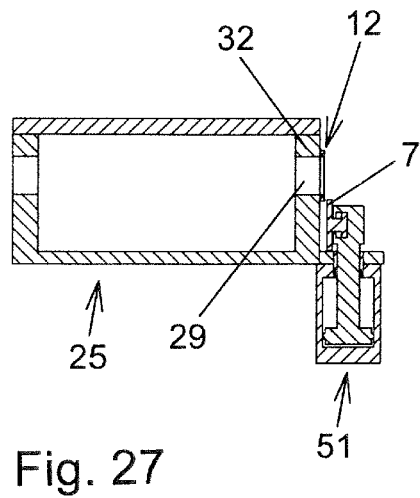

VACUUM VALVE OR VACUUM DOOR

TECHNICAL FIELD

The invention relates to a vacuum valve or a vacuum door having a closure plate for closing an opening which is arranged in a wall and which has opposite first and second longitudinal edges and, by comparison, shorter, opposite first and second transverse edges, wherein the closure plate is adjustable between an open position, in which the opening of the wall is opened up, and a closed position, in which the opening of the wall is closed by the closure plate.

BACKGROUND

In vacuum installations in which vacuum processes have to be carried out on relatively large, flat substrates, for example panels of screens, the vacuum chambers have large, slot-shaped openings in walls in order to enable the substrates to be introduced into the chamber. Accordingly, use is made of vacuum valves, in particular as transfer valves, and vacuum doors having large, slot-shaped openings. Vacuum valves are used in particular as transfer valves between adjacent vacuum chambers which are connected via the valve. Vacuum doors are used for closing and opening an opening of the chamber with respect to the outside space. The substantially rectangular openings arranged in the wall of the chamber or in the walls of the basic body of the vacuum valve or in the wall of the basic body of the vacuum door therefore have opposite longitudinal edges and, by comparison, substantially shorter opposite transverse edges. The longitudinal edges can have, for example, lengths in the range of 1.5 to 3 m. The transverse edges can have, for example, lengths in the range of 10 to 20 cm.

If, in the case of such vacuum valves, the interior space of a vacuum chamber, to which the vacuum valve or the vacuum door is attached, is evacuated proceeding from atmospheric pressure, deformations of the vacuum chamber occur because of the negative pressure formed in the interior space of the vacuum chamber. Said deformations have the result that the width of the slot-shaped opening toward the center is reduced somewhat, i.e. central portions of the longitudinal edges of the opening and correspondingly also the wall portions adjoining the opening in these regions move toward one another. The displacements of the longitudinal edges of the opening in the center thereof may be, for example, in the range from 1.5 mm to 3 mm. Owing to its screw connection to the vacuum chamber, the screw connection being present between the wall having the opening of the vacuum chamber and the wall having the opening of the basic body of the vacuum valve or of the vacuum door, a basic body of a vacuum valve connected to the vacuum chamber or of a vacuum door in the region of the wall, having the opening, of the basic body of the vacuum valve or of the vacuum door is deformed in the same way.

These displacements of the wall portions of the basic body adjoining the opening in the central portions of its longitudinal edges result in a shearing load of the sealing ring which is attached to the closure plate and lies on the wall having the opening. Over the course of the use, this results in abrasion of the sealing ring. This means firstly an additional wear of the sealing ring, and therefore the latter has to be exchanged at appropriate maintenance intervals. In addition, this abrasion brings about an undesirable production of particles which can be deposited on the substrate to be processed and can negatively influence the quality and functionality thereof.

In order to reduce the deformation of the vacuum chamber, the latter could be provided with additional reinforcing elements, but this is relatively costly.

WO 2014/086458 A1 discloses a vacuum valve in which housing walls which have the valve openings are formed from a thin metal sheet. This vacuum valve is arranged between vacuum units, for example vacuum chambers, which have solid walls with connection flanges. The valve housing of the vacuum valve is stabilized by connection of the vacuum valve to the connection flanges of said vacuum units. For this purpose, the vacuum valve has solid flange rings which are screwed to the connection flanges of the vacuum units, wherein the housing walls of sheet metal are clamped between the connection flanges and the flange rings. An elastomeric sealing ring is in each case provided here between a respective flange ring and the respective housing wall. A further elastomeric sealing ring lies between the flange ring and the connection flange. At least one of said flange rings of the vacuum valve at the same time forms the valve seat, on the side opposite the connection flange. An elastomeric sealing ring for sealing the closure member in relation to the connection flange in the closed state of the vacuum valve can be arranged here on the closure member or else on the connection flange. Since, for sealing between the connection flange and the flange ring and for sealing between the flange ring and the housing wall of sheet metal, the flange rings have to be rigidly connected circumferentially to the connection flanges, the flange rings are carried along during deformations of the connection flanges when the vacuum units are evacuated, and therefore the problem of the shearing load of the sealing ring, which is pressed between the flange ring and the closure member, in the closed state of the vacuum valve also occurs here.

SUMMARY

It is the object of the invention to provide an advantageous vacuum valve and an advantageous vacuum door and an advantageous combination of a vacuum chamber with vacuum door of the type mentioned at the beginning attached thereto, wherein a low production of particles and/or a long maintenance interval can be achieved in a cost-effective manner.

According to the invention, this is possible by means of a vacuum valve or a vacuum door having one or more of the features disclosed herein, and by a combination of a vacuum chamber with a vacuum door having one or more of the features disclosed herein.

In the case of the vacuum valve and in the case of the vacuum door and in the case of the combination of the vacuum chamber with the vacuum door according to the invention, a sealing unit is provided for sealing the closure plate in the closed position in relation to the wall which has the opening and which has a supporting frame. The latter has opposite first and second longitudinal legs and, by comparison, shorter, opposite first and second transverse legs.

In particular, the opposite longitudinal edges of the opening are at least five times, preferably at least ten times, longer than the opposite transverse edges of the opening, and the opposite first and second longitudinal legs of the supporting frame are at least five times, preferably at least ten times, longer than the opposite first and second transverse legs of the supporting frame. The opening and accordingly the frame opening enclosed by the supporting frame can therefore be referred to as slot-shaped.

Attached on one side of the supporting frame is a circumferential closure plate seal for interacting with the closure plate and attached on the other side of the supporting frame is a circumferential wall seal for interacting with the wall having the opening.

According to a first embodiment variant, the supporting frame is fastened at fastening points to the wall, having the opening, of the basic body of the vacuum valve or of the basic body of the vacuum door or of the vacuum chamber to which the vacuum door is attached. Here, at least central portions of the first and second longitudinal legs of the supporting frame are free in relation to the wall. According to a second embodiment variant, the supporting frame is fastened to the closure plate at fastening points. Here, at least central portions of the first and second longitudinal legs of the supporting frame are free in relation to the closure plate.

These "free" central portions of the longitudinal legs of the supporting frame advantageously extend over at least half, preferably over at least two thirds of the entire length of the longitudinal legs.

In the central portions of the first and second longitudinal legs, the supporting frame is thus movable, by the supporting frame bending, in relation to the wall (in the event that the supporting frame is fastened to the wall) or in relation to the closure plate (in the event of the fastening to the closure plate), i.e., in the event of the supporting frame being fastened to the wall, the central portions of the first and second longitudinal legs can be displaced in relation to the wall, or, in the event of the supporting frame being fastened to the closure plate, can be displaced in relation to the closure plate, with the supporting frame being deformed. This displacement takes place in the plane in which the supporting frame lies (=central plane of the supporting frame). This plane lies parallel to the plane in which the opening or the wall having the opening lies (=central plane of said wall), or parallel to the plane in which the closure plate lies (=central plane of the closure plate).

If, in the closed position of the closure plate, the vacuum chamber, to which the vacuum valve or the vacuum door is connected and by which an opening through the vacuum valve or the vacuum door is closable, is evacuated starting from atmospheric pressure and, as a result, deformation of this wall having the opening occurs, in which deformation the opposite first and second longitudinal edges of the opening increasingly move toward one another toward the longitudinal centers thereof, i.e. the opening becomes smaller toward the longitudinal center, the design according to the invention enables central portions of the longitudinal legs of the supporting frame to be carried along here over a portion of the displacement of the wall portions adjoining the opening, wherein this portion in the longitudinal center of the respective longitudinal leg is preferably between one third and two thirds of the entire displacement of the wall portion which adjoins the respective longitudinal edge of the opening and in which the respective longitudinal leg lies, in the region of the longitudinal center of the longitudinal edge. This carrying-along action can take place counter to an elastic restoring force of the supporting frame because of the friction between the wall seal and the wall on which the wall seal lies in the closed position of the closure plate. Owing to the elastic restoring force that the supporting frame has, the carrying-along action is, however, smaller than the entire displacement of the wall portion adjoining the longitudinal edge of the opening.

In order to ensure that the central portions of the longitudinal legs of the supporting frame are carried along in a defined region, wall stops can be provided on the wall having the opening, for interacting with the central portions of the first and second longitudinal legs of the supporting frame, in particular in the longitudinal center thereof, and/or closure plate stops can be provided on the closure plate for interacting with the central portions of the first and second longitudinal legs of the supporting frame, in particular in the region of the longitudinal center thereof.

In an advantageous embodiment of the invention, the fastening points at which the supporting frame is fastened to the wall or to the closure plate lie in the corner regions of the supporting frame, which corner regions are in each case formed between a longitudinal leg and an adjoining transverse leg of the supporting frame. Instead or in addition, fastening points can be provided in the region of the transverse legs. For example, fastening points can be formed by means of screws which pass through bores in the supporting frame. Instead or in addition, in order to fasten the supporting frame, snap elements, for example, can be provided. A respective fastening point can also extend over a supporting frame portion that is extended to a greater or lesser extent.

At least in regions of the free central portions of the first and second longitudinal legs of the supporting frame, the thickness of the supporting frame is smaller than the thickness of the wall having the opening, advantageously is less than half the size, preferably less than a third of the size (wherein these thicknesses are measured at a right angle to the plane of the wall having the opening, i.e. at a right angle to the plane of the supporting frame).

At least in regions of the free central portions of the longitudinal legs of the supporting frame, the width of the respective longitudinal leg, as measured parallel to the plane of the supporting frame and at a right angle to the longitudinal extent of the respective longitudinal leg, is advantageously smaller than the thickness of the wall having the opening (wherein the thickness of the wall is measured at a right angle to the plane of the wall).

A preferred embodiment of the invention makes provision for the supporting frame to have support elements lying next to the closure plate seal and next to the wall seal. If, in its closed position, the closure plate is pressed against the wall having the opening, the support elements can come into contact with contact surfaces firstly on the wall and secondly on the closure plate. The maximum compression of the closure plate seal and of the wall seal is therefore limited.

The support elements can be formed by elevations of the basic material of the supporting frame, from which the latter is formed. If the basic material of the supporting frame is a metal, in particular steel or aluminum, which is preferred, the supporting frame is coated with a sliding layer, at least in the regions of the contact surfaces of the support elements, the sliding layer advantageously having low friction in relation to the wall and the closure plate. For example, a coating with PTFE (Teflon) or PFA can be provided.

In a modified embodiment, support elements made from plastic (for example PTFE or PFA or PEEK) can be provided which are attached, for example adhesively bonded, to the basic body, composed in particular of metal, of the supporting frame.

In an advantageous embodiment of the invention, the longitudinal edges of the opening of the wall of the basic body or of the vacuum chamber have a length of more than 1 m. The transverse edges preferably have a length of less than 30 cm.

The supporting frame advantageously does not protrude inward over the edges of the opening in the wall, with respect to a viewing direction at a right angle to the plane of the wall. The supporting frame therefore does not reduce the clear width of the opening.

The closure plate seal can be formed by an O ring arranged in a groove of the supporting frame. For example, the closure plate seal can also be vulcanized onto the supporting frame.

The wall seal can be formed by an O ring arranged in a groove of the supporting frame. For example, the wall seal can also be vulcanized onto the supporting frame.

BRIEF DESCRIPTION OF THE DRAWINGS

Further advantages and details of the invention will be explained below with reference to the attached drawing, in which:

FIG. 5 shows a section along the line AA from FIG. 4;

FIG. 6 shows a section along the line BB from FIG. 4;

FIG. 7 shows a section analogously to FIG. 5 in the intermediate position of the closure plate;

FIG. 12 shows an oblique view of the sealing unit;

FIG. 13 shows a side view of the sealing unit on a first side for a second exemplary embodiment of the invention;

FIG. 14 shows a section along the line DD from FIG. 13;

FIG. 15 shows an enlarged detail E from FIG. 14;

FIG. 23 shows an oblique view of a vacuum door, mounted on a vacuum chamber, according to a further exemplary embodiment of the invention;

FIG. 24 shows a section of the device from FIG. 23 (section line analogously to FIG. 5) in the open position of the closure plate of the vacuum door;

FIG. 25 shows a section analogously to FIG. 24 in the intermediate position of the closure plate of the vacuum door;

FIG. 26 shows a section analogously to FIG. 24 in the closed position of the vacuum plate of the vacuum door; and FIG. 27 shows a section analogously to FIG. 24 for a further modified embodiment.

DETAILED DESCRIPTION

Figure 1:
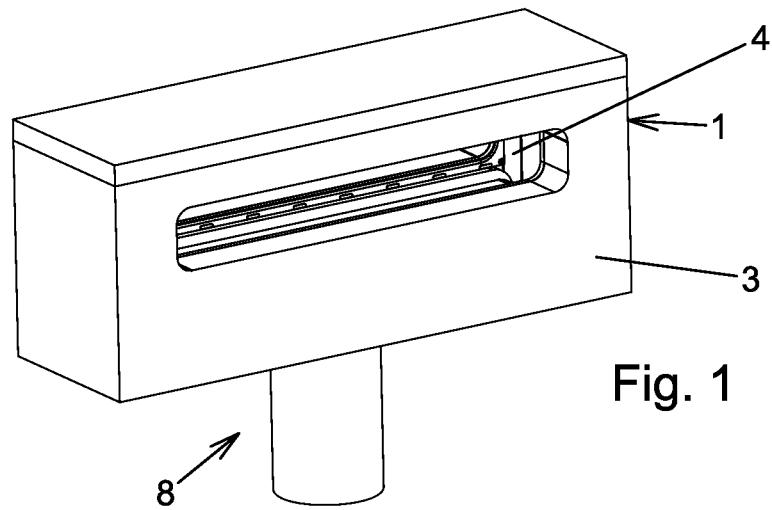
FIG. 1 shows an exemplary embodiment of a vacuum valve according to the invention in an oblique view.
Figure 2:
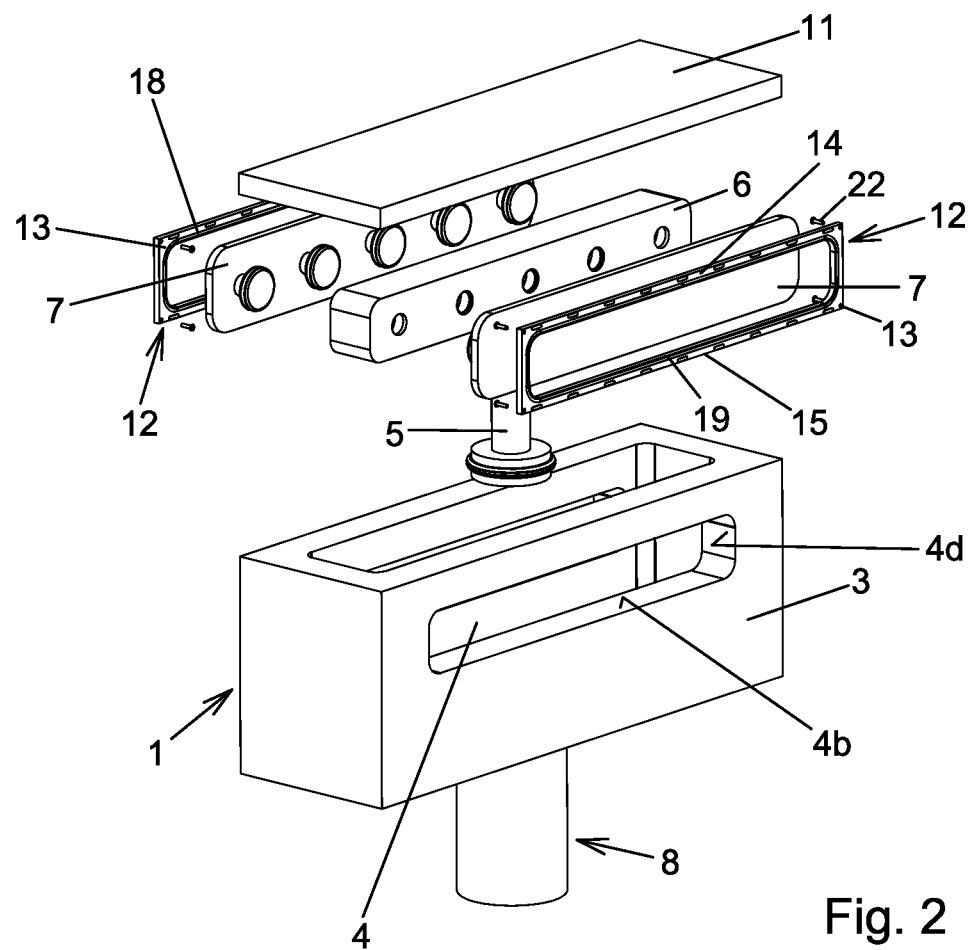
FIG. 2 shows an exploded illustration.
Figure 3:
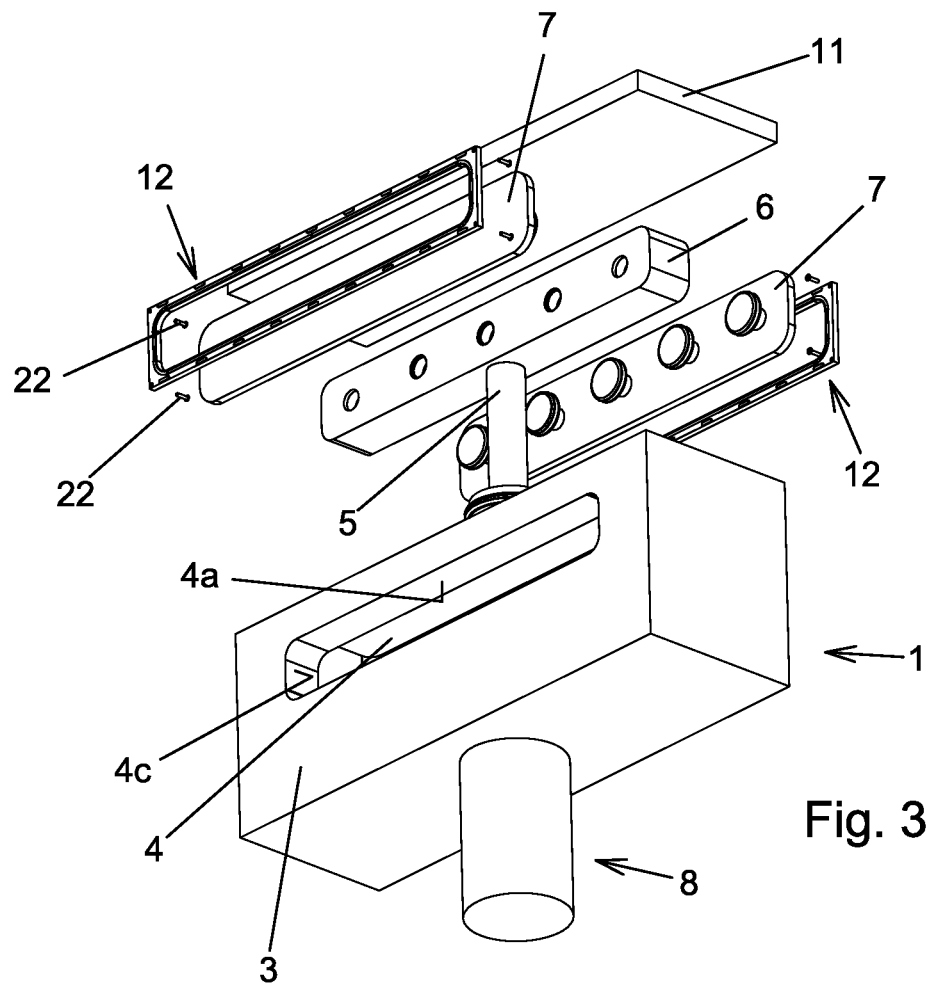
FIG. 3 shows an exploded illustration from a different viewing direction.
Figure 4:
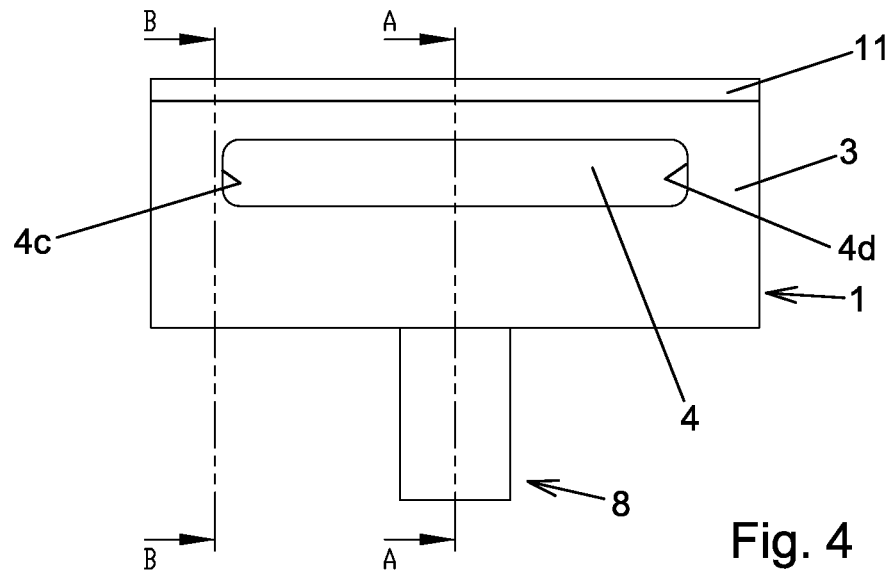
FIG. 4 shows a side view in the open position of the closure plate.
Figure 8:
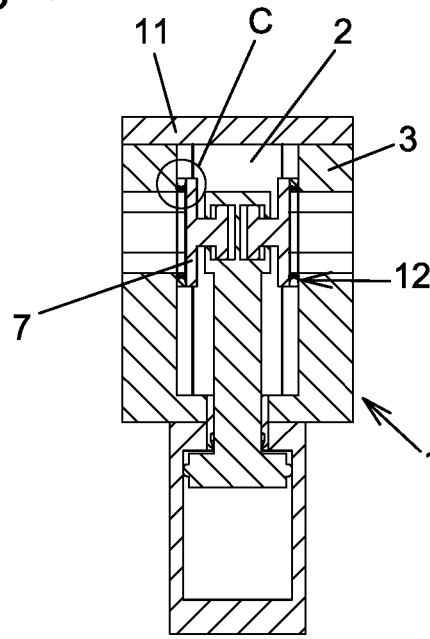
FIG. 8 shows a section analogous to FIG. 5 in the closed position of the closure plate (in the relaxed state of the basic body)

The figures have different scales and are partially simplified and schematized.

A first exemplary embodiment of a vacuum valve according to the invention is illustrated in FIGS. 1 to 12. The vacuum valve has a basic body 1 which is a valve housing and has an interior space 2, which is a vacuum region of the vacuum valve. A vacuum can therefore be present in the interior space 2.

The basic body 1 has opposite walls 3, in each of which an opening 4 is arranged.

A supporting unit 6 which, in the exemplary embodiment, bears two plate-like closure plates 7 is attached to a valve rod 5.

The closure plates 7 are each adjustable between an open position (cf. FIGS. 5 and 6), in which the respective assigned opening 4 is opened up, an intermediate position (cf. FIG. 7), in which the closure plate 7 is opposite the respective assigned opening 4 (=covers the opening 4, as seen in the axial direction of the opening 4), wherein, however, the closure plate 7 is not sealed in relation to the wall 3 having the assigned opening 4 (i.e. there is an open gap in the region between the closure plate and the wall), and a closed position (cf FIG. 8), in which the closure plate 7 seals the respective assigned opening 4.

In order to adjust the closure plate 7 between the open position and the intermediate position, the valve rod 5 is displaced parallel to its longitudinal axis 10 (=axially). For the axial displacement of the valve rod 5, use is made in the exemplary embodiment of a piston-cylinder unit 8, the piston rod of which forms the valve rod 5. Instead of a piston-cylinder unit 8, another actuator could also be provided as the valve drive.

In order to adjust the respective closure plate 7 between the intermediate position and the closed position, use is made of a respective piston-cylinder unit 9. The cylinder spaces of said piston-cylinder units 9 are formed by cavities of the supporting unit 6, in which pistons of said piston-cylinder unit 9 are arranged. The closure plates 7 are attached to the piston rods of said piston-cylinder units.

The adjustment of the respective closure plate 7 between its intermediate position and its closed position takes place at a right angle to the longitudinal axis 10 of the valve rod 5.

In the exemplary embodiment which is shown, the cylinder spaces of the piston-cylinder unit 9 are separated, i.e. the closure plates 7 can be adjusted individually between their intermediate positions and their closed positions. If a joint adjustment is sufficient, the pistons of the piston-cylinder units 9 could be arranged in a common continuous cylinder space.

One of the two closure plates 7 could also be omitted, and therefore the vacuum valve would have only one closure plate 7 and one sealable opening 4. In particular opposite the sealable opening 4, a non-sealable opening could be provided in the basic body in order, in the open position of the closure plate 7, to form a through channel through the basic body.

The adjustment of the at least one closure plate 7 between its open position and its closed position therefore takes place in the exemplary embodiment in the manner of an L valve.

Other types of adjustment of the at least one closure plate of the vacuum valve between the open position and the closed position, in particular in the manner of an L valve, could be provided, as is known. For example, it would also be conceivable and possible for the vacuum valve to have only one single actuator by means of which the at least one closure plate is adjusted from the open position via the intermediate position into the closed position, and vice versa. For the adjustment between the intermediate position and the closed position, the valve rod 5 could also be pivoted here about a pivot axis which is at a right angle to the longitudinal axis 10 of the valve rod and at a right angle to the axis of the at least one opening. Such a pivoting can be controlled in a known manner by slotted guide mechanisms. In the event that the vacuum valve has two closure plates 7, the latter could be adjusted from the intermediate position into the respective closed position alternately by oppositely directed pivotings of the valve rod 5.

To permit servicing, the basic body 1 in the exemplary embodiment has a removable cover 11 sealed by a seal (not illustrated) (fastening screws are not illustrated either).

The respective opening 4 is delimited by opposite first and second longitudinal edges 4*a*, 4*b* and by opposite first and second transverse edges 4*c*, 4*d*. As seen in plan view (FIG. 4), the respective opening 4 has a substantially rectangular form, wherein the longitudinal edges 4*a*, 4*b* are substantially longer than the transverse edges 4*c*, 4*d*, in particular more than five times longer, particularly preferably more than ten times longer. The openings 4 can therefore be referred to as slot-shaped.

For example, the longitudinal edges 4*a*, 4*b* can have a length which lies in the range of 1 to 4 m. The transverse edges 4*c*, 4*d* can have, for example, a length which lies in the range of 10 to 30 cm.

A sealing unit 12 is used in each case for sealing between the respective closure plate 7 and the wall 3 having the respectively assigned opening 4. Said sealing unit has a supporting frame 13 lying in a plane. Said supporting frame has first and second longitudinal legs 14, 15 which are spaced apart from one another and run in parallel. The opposite longitudinal legs 14, 15 are connected at the edges by opposite first and second transverse legs 16, 17. The longitudinal and transverse legs 14-17 therefore enclose a frame opening. The longitudinal and transverse legs 14-17 lie on the sides of an imaginary rectangle. The longitudinal legs 14, 15 are substantially longer here than the transverse legs 16, 17 in a manner corresponding to the shape of the openings 4. In particular, the longitudinal legs 14, 15 are more than five times, preferably more than ten times as long as the transverse legs 16, 17.

The thickness of the supporting frames 13 of the sealing units 12 are smaller than the thicknesses of the walls 3 having the openings 4, advantageously are less than half the size, preferably less than a third of the size (wherein said thicknesses are measured at a right angle to the respective plane of the wall having the opening, i.e. at a right angle to the plane of the respective supporting frame).

At least the longitudinal legs 14, 15 of the respective supporting frame 13 have a width, as measured parallel to the plane of the supporting frame and at a right angle to the longitudinal extent of the respective longitudinal leg 14, 15, which is smaller than the thickness of the respective wall 3 having the opening 4, wherein the thickness of the wall is measured at a right angle to the plane of the wall 3.

A seal is in each case arranged on the oppositely directed side surfaces of the supporting frame 13 that lie parallel to the center plane of the supporting frame 13. On the one side, this is the circumferential (=annular) closure plate seal 18, on the other side this is the circumferential (=annular) wall seal 19. The seals 18, 19 are each composed of an elastomeric material, for example FKM (Viton) or FFKM.

In the exemplary embodiment, the closure plate seal 18 and the wall seal 19 are designed in the form of O rings which are arranged in grooves of the supporting frame 13 and are thereby held on the supporting frame 13. In a modified embodiment, the closure plate seal 18 and/or the wall seal 19 could also be vulcanized onto the supporting frame 13.

On the sides of the supporting frame 13, to which sides the closure plate seal 18 and wall seal 19 are attached, the supporting frame 13 in each case has elevations which lie next to the seals 18, 19 and which form support elements 20. The latter delimit the compression of the closure plate seal 18 and the wall seal 19 in the closed position of the respective closure plate 7.

In this exemplary embodiment, the support elements 20 are formed by the basic material of the supporting frame 13, which basic material is preferably a metal, in particular steel or aluminum. In order to reduce the friction in relation to the closure plate 7 and the wall 3, at least in the region of the contact surfaces of the support elements 20, which serve for contact with the closure plate 7 and with the wall 3, this basic material of the supporting frame 13 is coated with a sliding layer which has a low coefficient of friction in relation to the closure plate 7 and the wall 3. The coefficient of friction of the material of the sliding layer, for example plastic, in relation to the closure plate 7 and the wall is at any rate lower than the coefficient of friction of the basic material of the supporting frame 13 in relation to the closure plate 7 and the wall 3. For example, PTFE or PFA can be provided for coating the supporting frame 13.

An overall design of the supporting frame 13 from a plastics material, in particular a thermosetting plastic, is also conceivable and possible.

The wall 3 and the closure plate 7 are preferably composed of metal, in particular of steel.

In the exemplary embodiment, a plurality of support elements 20 which are spaced apart from one another are arranged in each case next to the first and the second longitudinal legs 14, 15. For example, a continuous, strip-shaped support element could also run next to the first longitudinal leg 14 and the second longitudinal leg 15. For example, a design in the manner such that an annular strip runs as the respective support element next to the respective seal 18, 19 would also be possible.

In the exemplary embodiment, the support elements 20 are furthermore arranged radially outside the seals 18, 19. Instead or in addition, support elements could also be arranged radially within the seals 18, 19.

In this exemplary embodiment, a respective supporting frame 13 is fastened only to the respective wall 3 such that the frame opening surrounds the respective opening 4. The fastening is undertaken here in such a manner that the longitudinal legs 14, 15 of the supporting frame 13 remain free in relation to the wall 3 at least in central portions which preferably make up at least half, particularly preferably at least two thirds of the length of the longitudinal legs 14, 15. In the exemplary embodiment, the fastening is undertaken in the four corner regions between the longitudinal legs 14, 15 and transverse legs 16, 17. For this purpose, the supporting frame 13 has bores 21 in said corner regions. Screws 22 are screwed through said bores into threaded bores of the respective wall 3.

Figure 10:
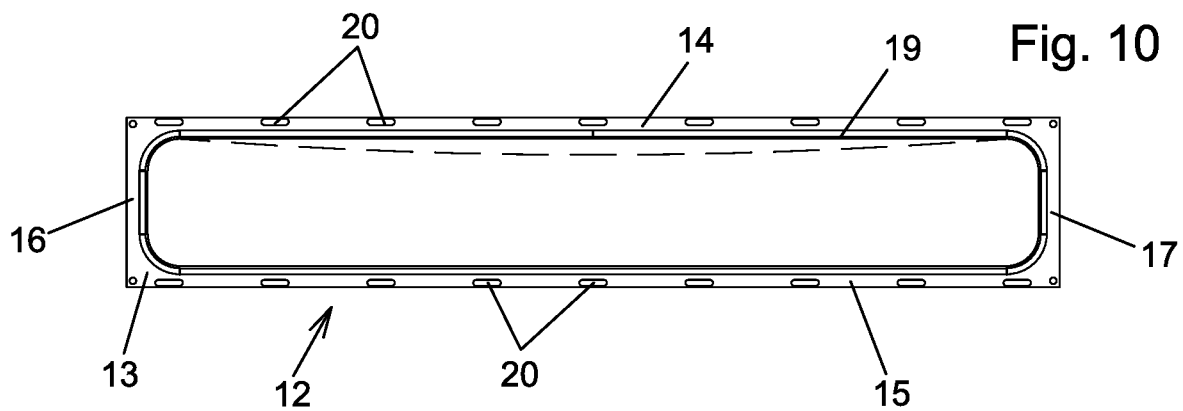
FIG. 10 shows a side view of the sealing unit on a first side.
Figure 11:
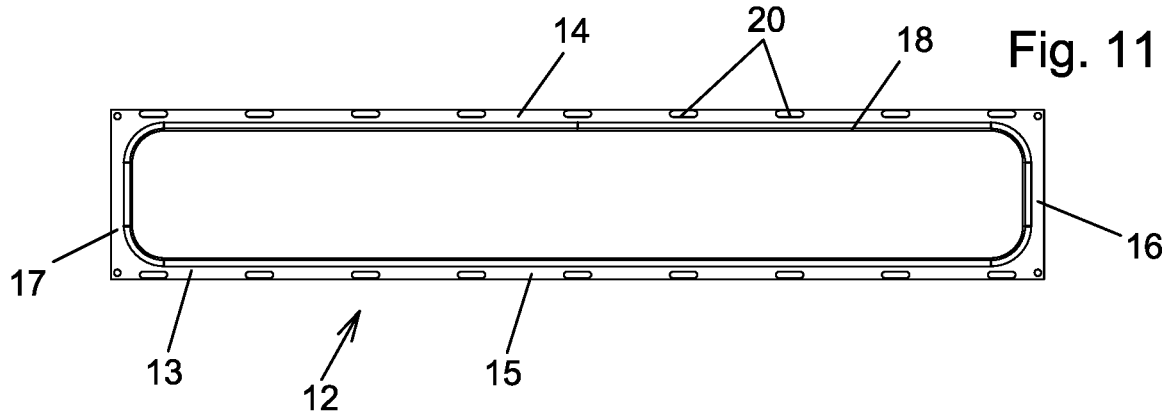
FIG. 11 shows a side view of the sealing unit on an opposite second side.

Owing to the fact that the longitudinal legs 14, 15 remain free at least in central portions, the longitudinal legs 14, 15 of the elastically deformable supporting frame 13 can be bent, with deformation of the supporting frame, in such a manner that they increasingly approach one another toward their longitudinal centers, cf. the dashed line in FIG. 10 which indicates such a possible bending of one of the longitudinal legs in a schematically exaggerated way.

A vacuum valve according to the invention can be used, for example, as a transfer valve for arrangement between two vacuum chambers. The vacuum chambers then have openings aligned with the openings 4 and are connected to the walls 3 via screw connections and seals, as is known and is not illustrated in detail in the figures.

The initial situation is now one in which the vacuum valve is arranged between two vacuum chambers to which it is connected. The connection takes place in each case by a plurality of screws which are arranged in the region around the respective opening 4, wherein the wall 3 having the opening 4 and a wall of the valve chamber that has a corresponding opening which is aligned with the opening 4 are screwed to one another.

If a vacuum chamber which is connected to the vacuum valve in this way is evacuated proceeding from atmospheric pressure, the vacuum chamber wall which is connected to the wall 3 of the vacuum valve is deformed in such a manner that the width of the slot-shaped opening in the wall is reduced somewhat toward the center, i.e. central portions of the longitudinal edges of the opening and correspondingly also the wall portions adjoining the opening in these regions move toward one another. Owing to its screw connection to the wall 3 of the vacuum valve, the wall 3 is deformed in the region around the opening in the same manner. The width of the opening 4 in the wall 3 of the basic body is therefore reduced somewhat toward the center, i.e. central portions of the longitudinal edges 4a, 4b of the opening 4 and correspondingly also the portions of the wall 3 that adjoin the opening 4 in these regions are displaced in such a manner that they move toward one another, i.e. approach one another.

Figure 9:
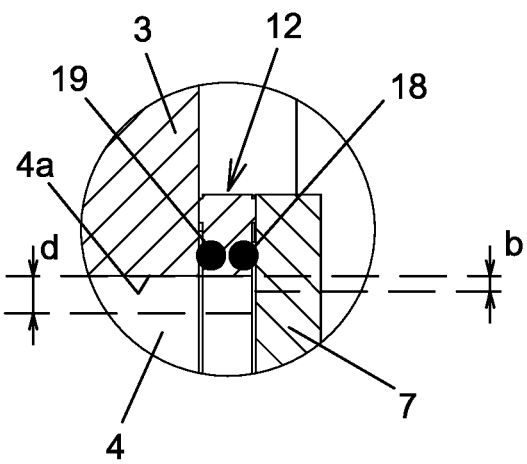
FIG. 9 shows an enlarged detail C from FIG. 8.

In the region of the longitudinal centers of the longitudinal edges 4a, 4b, this approach can lie, for example, in the range of 1.5 mm to 6 mm. In FIG. 9, the position of the longitudinal edge 4a of the opening 4 in the deformed state of the wall 3 is indicated by a dashed line. The displacement in relation to the relaxed state of the wall 3 is denoted by a.

If the closure plate is in its closed position during the deformation of the wall 3, and the sealing unit 12 is therefore pressed onto the wall 3, during the displacement of the portion of the wall 3 adjoining the respective longitudinal edge 4a, 4b the respective longitudinal leg 14, 15 of the supporting frame is at least partially carried along by the friction force acting thereon. Said carrying-along action takes place here counter to the elastic restoring force of the supporting frame 13. The carrying-along action is therefore smaller than the movement a of the portion of the wall 4 adjoining the respective longitudinal edge 4a, 4b. The position of the longitudinal leg 14 of the supporting frame 13 in the deformed state of the wall 3 is indicated in FIG. 9 by a dashed line, and the displacement in relation to the relaxed state of the wall 3 (which is illustrated by solid lines) is denoted by b.

The size of the displacement b of the center of the respective longitudinal leg 14, 15 of the respective supporting arm 13 is preferably one third to two thirds of the size of the displacement a of the assigned wall 3, with a value of approx. ½ being particularly preferred. Compared to an individual seal acting between the wall 3 and the closure plate 7, each of the two seals 18, 19 therefore undergoes a smaller shearing load. The abrasion during the course of the use is thereby reduced and so too is the production of particles. It should be taken into consideration in this connection that the production of particles is substantially higher when a seal is worn than when a seal is not worn. The reduction, achieved by the invention, in the production of particles therefore has an increasingly more pronounced effect over the use time of the seals. The maintenance interval can therefore also be extended and nevertheless can remain here below the production of particles in a conventional valve.

A second exemplary embodiment for the sealing unit 12 is illustrated in FIGS. 13 to 15. The differences over the first exemplary embodiment will be explained below, wherein the design otherwise corresponds to that of the first exemplary embodiment. In this exemplary embodiment, the support elements 20 are formed by plastics parts which are attached to the basic material of the supporting frame 13. Said plastics parts have a lower coefficient of friction in relation to the wall 3 and the closure plate 7 than the basic material of the supporting frame.

Figure 16:
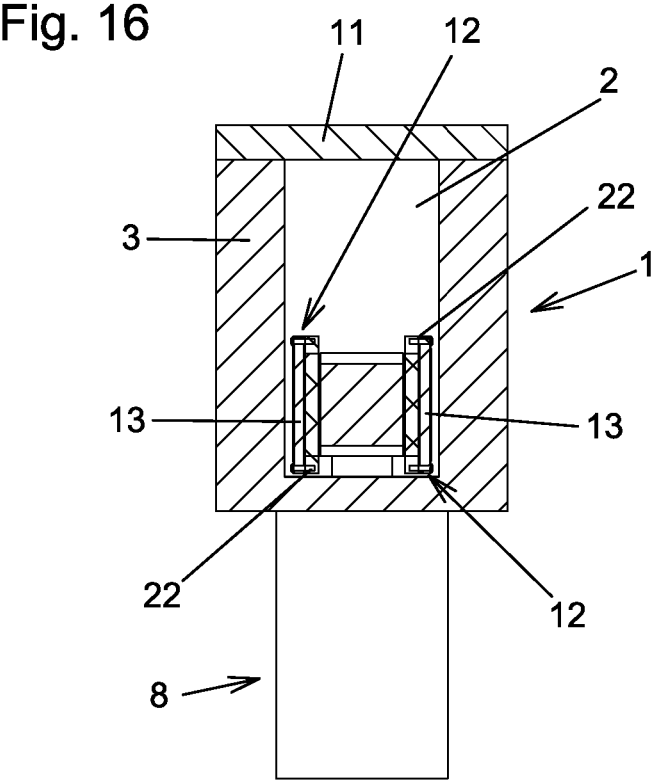
FIG. 16 shows a section analogously to FIG. 6 for a third exemplary embodiment of the invention.

A third exemplary embodiment is illustrated in FIG. 16. The differences over the first exemplary embodiment will be explained below, wherein the design otherwise corresponds to that of the first exemplary embodiment. The respective supporting frame 13 is not fastened here to the respective wall 3, but only to the respective closure plate 7. The attaching to the closure plate 7 takes place here in an analogous manner to the attaching to the wall 3 in the first exemplary embodiment. In particular, the supporting frame 13 therefore has bores in the corner regions, through which bores screws 22 pass, the screws being screwed into threaded bores of the closure plate 7. At least central portions of the longitudinal legs 14, 15 of the supporting frame 13, which central portions are preferably at least half, particularly preferably at least two thirds of the length of the longitudinal legs 14, 15, are therefore free in relation to the closure plate 7.

In the closed position of the respective closure plate 7, the frame opening surrounds the opening 4 in the wall 3, and, during the deformation of the wall 3 and therefore opening 4 by evacuating the vacuum chamber which is connected to the wall 3, the central portions of the longitudinal legs 14, 15 can be bent in a completely analogous manner as in the first exemplary embodiment.

Figure 17:
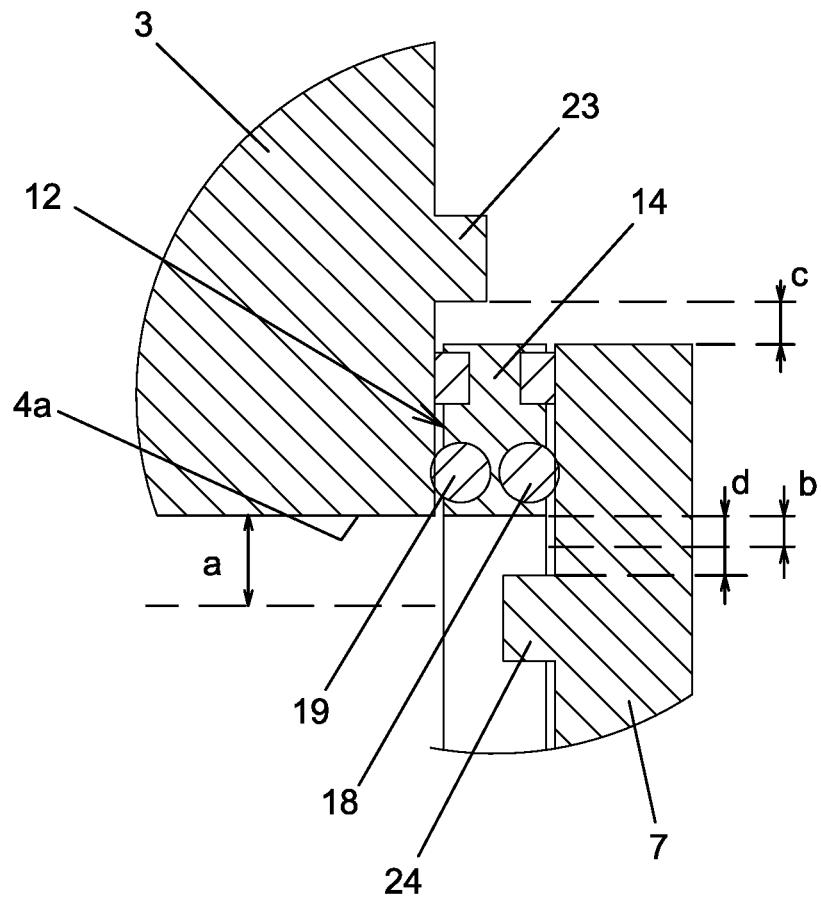
FIGS. 17 and 18 show enlarged details analogously to FIG. 9 for a fourth exemplary embodiment of the invention in the relaxed and in the deformed state of the basic body.
Figure 18:
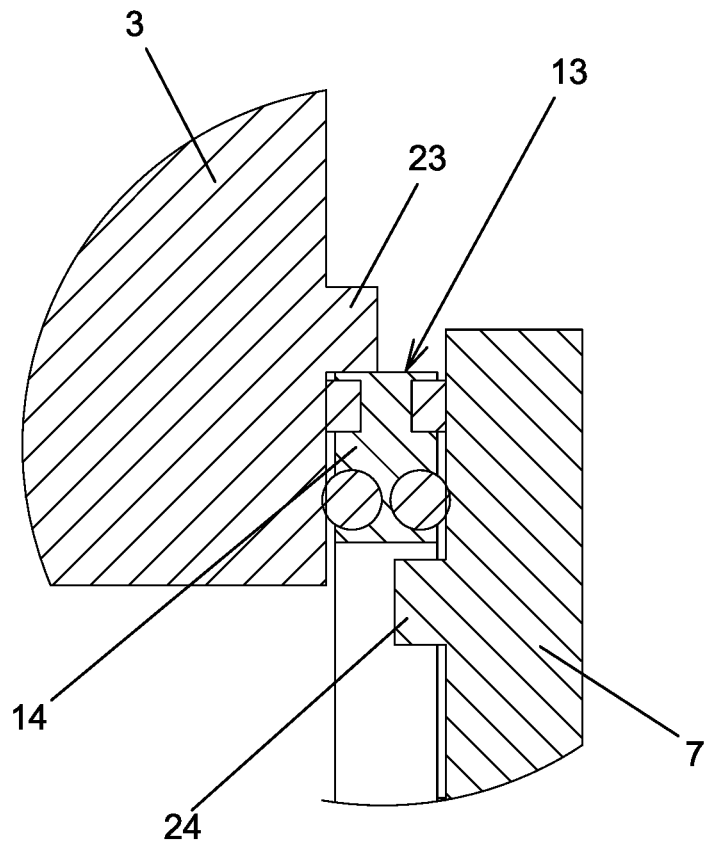

A fourth exemplary embodiment of the invention is illustrated in FIGS. 17 and 18. The differences over the first exemplary embodiment will be explained below, wherein the design otherwise corresponds to that of the first exemplary embodiment.

In this exemplary embodiment, wall stops 23 and closure plate stops 24 are provided in order to ensure that the size of the carrying-along action of the respective longitudinal leg 14, 15 during a deformation of the respective portion of the wall 3 adjoining the respective opening is within a desired range, in particular in the longitudinal center of the respective longitudinal leg 14, 15 is between one third and two thirds of the size of the displacement of the longitudinal center of the respective longitudinal edge 4a, 4b of the respective opening 4.

The wall stops 23 and closure plate stops 24 interact with the central portions of the longitudinal legs 14, 15 of the supporting frame 13, in particular in the region of the longitudinal center thereof.

FIG. 17 illustrates the state which is present when the closure plate 7 is in the closed position and the basic body 1 is relaxed. FIG. 18 illustrates the state which arises when the wall is deformed by evacuating the vacuum chamber connected to the wall 3.

FIG. 17 shows the size a of the displacement of the longitudinal edge 4a of the opening 4 in its longitudinal center. The wall stop 23 is also displaced by the value a between the state of FIG. 17 and FIG. 18. Furthermore, the initial distance c (=present in the relaxed state of the basic body 1) between the wall stop 23 and the longitudinal leg 14 of the supporting frame 13 and the initial distance d between the closure plate stop 24 and the longitudinal leg 14 of the supporting frame 13 are shown. The stops 23, 24 therefore lie on both sides of the relevant longitudinal leg 14, 15 of the supporting frame 13, wherein the distances c, d are smaller than the size a of the displacement. The distances c, d preferably in each case lie in the range of one third to two thirds of the size of a. The sum of the distances c and d is at least a, and preferably somewhat more (in order, in the event of a tolerance of the value a, to avoid jamming of the longitudinal leg 14, 15). The sum of c and d is preferably less than four thirds of the size of a.

Should, during the displacement of the wall 3, the friction with respect to the longitudinal leg 14, 15 be of such a small size in the portion of the wall adjoining the respective longitudinal edge 4a, 4b during the evacuating of the basic body 1, that said longitudinal leg is only carried along a little, if at all, the stop 23 passes during the displacement of the wall 3 (at the earliest after the displacement distance c) into contact with the relevant longitudinal leg 14, 15 and displaces the longitudinal leg 14, 15 during the further displacement of the wall 3. The end state of this situation is illustrated in FIG. 18.

Should, during the displacement of the wall 3, the friction in relation to the relevant longitudinal leg 14, 15 be of such a size that said longitudinal leg is at least substantially carried along in a manner corresponding to the displacement of the wall 3, during the course of the displacement of the wall 3 the relevant longitudinal leg 14, 15 passes into contact with the closure plate stop 24 (at the earliest after the displacement distance d) and, during a further displacement of the wall 3, is blocked against further displacement. In this case, the relevant longitudinal leg 14, 15 lies on the closure plate stop 24 in the end state (not illustrated in the figures).

The displacement b of the longitudinal leg 14 in the region of its longitudinal center is likewise shown in FIG. 17. As already mentioned, the size of the displacement b lies in the range of one third to two thirds of the size a.

Figure 19:
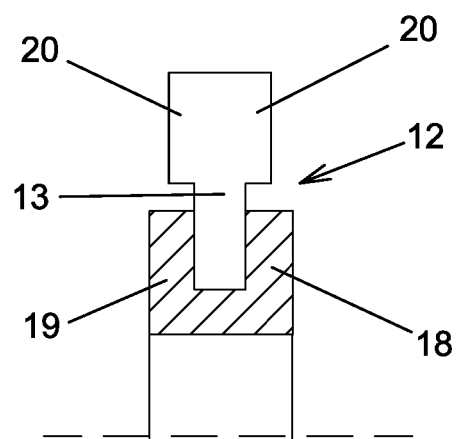
FIG. 19 shows a section analogously to FIG. 15 of a supporting frame according to a fifth exemplary embodiment of the invention.

A further modified exemplary embodiment is illustrated schematically in FIG. 19. A sealing material is vulcanized here onto the supporting frame 13 and extends continuously from one side of the supporting frame to the other side and runs here over a narrow side of the supporting frame. Portions of said sealing material located on opposite sides of the supporting frame 13 here form the closure plate seal 18 and the wall seal 19.

Figure 20:
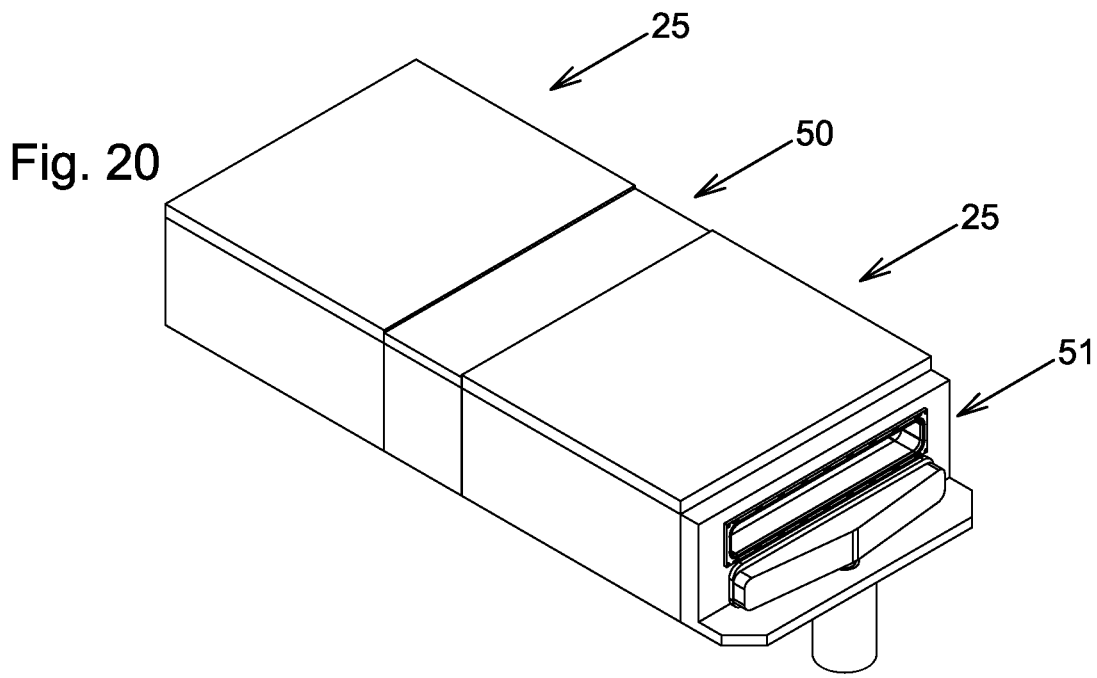
FIG. 20 shows an oblique view of a vacuum valve, mounted between two vacuum chambers, according to the first exemplary embodiment of the invention and of a vacuum door, mounted on one of the vacuum chambers, according to the invention.
Figure 21:
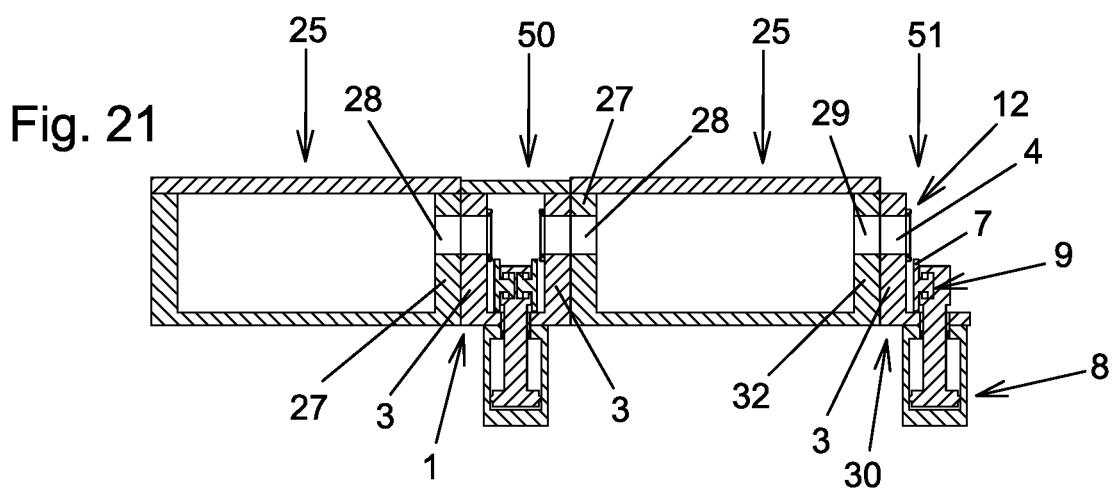
FIG. 21 shows a section through the device from FIG. 20 (section line analogously to FIG. 5) in the open position of the closure plate of the vacuum valve and of the vacuum door.
Figure 22:
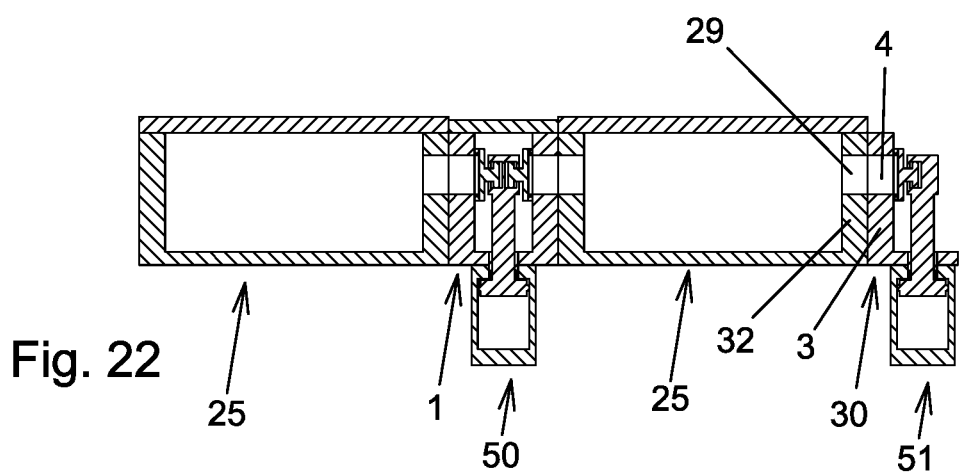
FIG. 22 shows a section corresponding to FIG. 21 in the closed position of the vacuum plates of the vacuum valve and of the vacuum door.

FIGS. 20 to 22 show a vacuum valve 50 mounted between two vacuum chambers 25. The vacuum valve 50 is designed in accordance with the first exemplary embodiment of the invention and, in the illustration of FIGS. 20 and 21, the closure plate 7 is in the open position, and in the closed position in FIG. 22. The basic body 1 of the vacuum valve 50 is attached by the walls 3 which have the openings 4 to adjacent walls 27 of the vacuum chambers 25. The openings 4 in the walls 3 of the basic body 1 of the vacuum valve 50 are aligned here with the openings 28 in the walls 27 of the vacuum chamber 25, i.e. the openings 4 of the basic body 1 and the openings 28 of the walls 27 of the vacuum chambers 25 have identical shapes and sizes and their edges adjoin one another in a flush manner. For the vacuum-tight connection between the walls 3 of the vacuum valve 50 and the walls 27 of the vacuum chamber 25, use is made of screws, not illustrated in FIG. 20, and of a sealing ring, likewise not illustrated in FIG. 20, which surrounds the openings 4, 28. The screws can be screwed, for example, from the interior space 26 of the respective vacuum chamber 25 through openings in the wall 27 into threaded bores in the wall 3 of the basic body 1 of the vacuum valve 50. In this case, there are a plurality of screws which annularly surround the openings 4, 28 (within or outside the sealing ring). A reverse screw connection, starting from the interior space 2 of the basic body 1 through openings in the walls 3 into threaded bores in the walls 27, can also be provided.

If one of the vacuum chambers 25 is evacuated proceeding from atmospheric pressure (to a pressure which is less than one tenth of the atmospheric pressure), the opening 28 is deformed, wherein the longitudinal edges of the opening 28 move toward one another in central portions. Portions of the wall 27 adjoining the opening 28 in these regions move toward one another here and, by means of the screw connection to the assigned wall 3 of the basic body 1, carry along the corresponding portions of the wall 3 such that the opening 4, as already described, is also analogously deformed.

The vacuum chamber 25 illustrated on the right in FIG. 20 has, in a wall 32, a further opening 29 which is closable by a vacuum door 51 according to the invention. In the open state of the vacuum door 51, said vacuum chamber 25 is therefore connected to the surrounding space via the opening 29. Substrates to be processed can be introduced into the vacuum installation through the opening 29.

The vacuum door 51 is designed substantially analogously to the previously described first exemplary embodiment of the vacuum valve. The differences in relation to said vacuum valve will in particular be described below. The same reference signs as for the vacuum valve are at least partially used for the vacuum door 51.

In this exemplary embodiment of a vacuum door 51 according to the invention, the basic body 30, in contrast to the vacuum valve, is not designed as a housing with a closed interior space. However, in a completely analogous manner to the vacuum valve, it has a wall 3 with an opening 4 which is formed in the same way as described in conjunction with the vacuum valve. In order to open up and close the opening 4 in the wall 3 of the basic body 30, use is in turn made of a closure plate 7 which is adjustable between an open position, in which the opening 4 is opened up, and a closed position, in which the opening 4 is closed in a vacuum-tight manner. The adjustment can take place in the same manner as described in conjunction with the vacuum valve via an intermediate position, for which purpose use is made here of piston-cylinder units 8, 9. The adjustment can also take place in a modified manner and, for this purpose, reference is likewise made to the description in conjunction with the vacuum valve.

For the sealing between the closure plate 7 and the wall 3 in the closed position of the closure plate 7, use is made of a sealing unit 12 which is designed identically to the sealing unit 12 described in conjunction with the vacuum valve.

In this exemplary embodiment, as described in conjunction with the first exemplary embodiment of the vacuum valve, the sealing unit 12 is attached to the wall 3. Also in the case of the vacuum door 51, the sealing unit 12 could instead be attached to the closure plate 7, as described in conjunction with the third exemplary embodiment of the vacuum valve (cf. FIG. 16).

The other modifications described in conjunction with the vacuum valve are likewise possible in the vacuum door 51. For example, in order to ensure that the bending of the longitudinal legs 14, 15 of the supporting frame 13 lies within a desired range, there could be wall stops and valve plate stops analogously to the wall stops 23 and valve plate stops 24 of the vacuum valve. The support elements 20 could also be formed by separate elements.

However, it would also be conceivable and possible in the case of a vacuum door for a housing-shaped basic body 1 to be used. The opening opposite the opening sealed by the valve plate and the closure unit could remain free here, or said opening could likewise be sealable by a valve plate. The previously described embodiments of vacuum valves could therefore also be used as a vacuum door.

A further modified embodiment of a vacuum door 51 is illustrated in FIGS. 23 to 26. The difference over the previously described embodiments of the vacuum door consists here in that the sealing unit 12 interacts directly with the wall 32 of the vacuum chamber 25. The vacuum door 51 is fastened to the vacuum chamber 51 via a basic body 31. However, the basic body 31 does not have a wall 3 with an opening 4 aligned with the opening 29 of the wall 32 of the vacuum chamber 25.

If the vacuum chamber 25 is evacuated proceeding from atmospheric pressure, the opening is deformed, wherein central portions of the first and second longitudinal edge 29a, 29b approach one another. The wall seal 19 of the sealing unit 12 lies here directly on the wall 32. The functioning is completely analogous to that described in conjunction with the vacuum valve.

In the exemplary embodiment illustrated in FIGS. 23 to 26, the sealing unit 12, which in turn is designed in the same manner as described previously, is attached to the closure plate 7 (likewise as already described).

FIG. 27 shows a further modification. Here, the sealing unit is attached to the wall 32 of the vacuum chamber 25, specifically in a completely analogous manner as in the case of the attachment to the wall 3 of the basic body 1. The supporting frame 13, by means of its frame opening, therefore surrounds the opening 29 of the wall 32 of the vacuum chamber 25, and at least central portions of the first and second longitudinal legs 14, 15 of the supporting frame remain free in relation to the wall 32. The fastening points to the wall 32 therefore lie again in particular in the corner regions between the longitudinal legs and transverse legs and/or in regions of the transverse legs.

The further modifications described in conjunction with the vacuum valve can also be applied here in an analogous manner.

KEY TO THE REFERENCE NUMBERS

1 Basic body
2 Interior space
3 Wall
4 Opening
4a First longitudinal edge
4b Second longitudinal edge
4c First transverse edge
4d Second transverse edge
5 Valve rod
6 Supporting unit
7 Closure plate
8 Piston-cylinder unit
9 Piston-cylinder unit
10 Longitudinal axis
11 Cover
12 Sealing unit
13 Supporting frame
14 First longitudinal leg
15 Second longitudinal leg
16 First transverse leg
17 Second transverse leg
18 Closure plate seal
19 Wall seal
20 Support element
21 Bore
22 Screw
23 Wall stop
24 Closure plate stop
25 Valve body
26 Interior space
27 Wall
28 Opening
29 Opening
29a First longitudinal edge
29b Second longitudinal edge
30 Basic body
31 Basic body
32 Wall
50 Vacuum valve
51 Vacuum door

The invention claimed is:

1. A vacuum valve or vacuum door, comprising:
a closure plate for closing an opening which is arranged in a wall and has opposite first and second longitudinal edges and, by comparison, shorter, opposite first and second transverse edges;
the closure plate is adjustable between an open position, in which the opening of the wall is opened up, and a closed position, in which the opening of the wall is closed by the closure plate;
a sealing unit configured to seal the closure plate in relation to the wall, the sealing unit having a supporting frame which has opposite first and second longitudinal legs and, by comparison, shorter, opposite first and second transverse legs and to which is attached on one side a circumferential closure plate seal and on an opposite side a circumferential wall seal; and
 (a) the supporting frame is fastened or fastenable to the wall at fastening points, wherein at least central portions of the first and second longitudinal legs of the supporting frame are free in relation to the wall, or
 (b) the supporting frame is fastened to the closure plate at fastening points, wherein at least central portions of the first and second longitudinal legs of the supporting frame are free in relation to the closure plate.

2. The vacuum valve or vacuum door as claimed in claim 1, wherein the free central portions of the first and second longitudinal legs extend over at least half of a length of the first and second longitudinal legs.

3. The vacuum valve or vacuum door as claimed in claim 2, wherein the free central portions of the first and second longitudinal legs extend over at least two thirds of the length of the first and second longitudinal legs.

4. The vacuum valve or vacuum door as claimed in claim 1, wherein the fastening points lie in at least one of corner regions between the longitudinal legs and the transverse legs or in regions of the transverse legs.

5. The vacuum valve or vacuum door as claimed in claim 4, wherein, in at least one of the corner regions between the longitudinal legs and transverse legs or in the regions of the transverse legs, the supporting frame has holes through which screws for fastening the supporting frame to the wall or to the closure plate are screwable into threaded bores in the wall or in the closure plate.

6. The vacuum valve or vacuum door as claimed in claim 1, wherein the wall having the opening and the supporting frame lie in parallel planes.

7. The vacuum valve or vacuum door as claimed in claim 1, wherein the supporting frame has support elements arranged next to the closure plate seal and next to the wall seal.

8. The vacuum valve or vacuum door as claimed in claim 7, wherein the support elements are comprised of plastic, or the supporting frame is coated with a sliding layer at least in regions of contact surfaces of the support elements.

9. The vacuum valve or vacuum door as claimed in claim 1, wherein a thickness of the supporting frame at least in regions of the free central portions of the first and second longitudinal legs is smaller than a thickness of the wall having the opening.

10. The vacuum valve or vacuum door as claimed in claim 1, wherein, at least in regions of the free central portions of the longitudinal legs of the supporting frame, a width of the respective longitudinal leg, as measured parallel to a plane of the supporting frame and at a right angle to a longitudinal extent of the respective longitudinal leg, is smaller than a thickness of the wall having the opening.

11. The vacuum valve or vacuum door as claimed in claim 1, wherein the wall has wall stops configured for interacting with the central portions of the first and second longitudinal legs of the supporting frame and which are in each case spaced apart from the respective longitudinal legs of the supporting frame in the closed position of the valve plate and in a relaxed state of the wall.

12. The vacuum valve or vacuum door as claimed in claim 1, wherein the closure plate has, for interacting with the central portions of the first and second longitudinal legs, closure plate stops which are each spaced apart from the respective longitudinal leg of the supporting frame in the closed position of the closure plate and in a relaxed state of the wall.

13. The vacuum valve or vacuum door as claimed in claim 1, wherein the closure plate is adjustable from the open position via an intermediate position, in which it covers the opening, but there is a gap between the closure plate and the sealing unit attached to the wall or between the sealing unit attached to the closure plate and the wall, into the closed position.

14. The vacuum valve or vacuum door as claimed in claim 1, wherein the opening is arranged in a wall of a basic body of the vacuum valve or of the vacuum door.

15. A vacuum arrangement having the vacuum valve or vacuum door as claimed in claim 14, wherein the wall, having the opening, of the basic body is connected to the wall of a vacuum chamber via a screw connection.

16. The vacuum door as claimed in claim 1, wherein the opening is arranged in a wall of a vacuum chamber to which the vacuum door is attached.

* * * * *